3,224,920
METHOD OF MAKING PLIED FIBER LAMINATES UTILIZING COACTING RESINS
Peter Bosworth, Bitterne, Southampton, England, assignor to The Borden Company, a corporation of New Jersey
No Drawing. Filed Sept. 28, 1961, Ser. No. 143,008
6 Claims. (Cl. 156—315)

This invention relates to fiber reinforced, plied plastics.

In making such articles permanently strong and nonporous, it is usual to have a resin as the continuous phase in which the fibers are embedded and in such condition that the resins are not extractable by water. Furthermore, it would be desirable in the manufacturing process, to have the several plies adhere quickly and dependably at their surfaces to be joined, as during the short period of pressing between heated rollers or in a few minutes at most in a hot press, with the main mass of the resins that are not exposed on the said surfaces subject to curing eventually, either with or without continuation of the pressure.

The present invention meets this need.

Briefly stated, the invention comprises the herein described process of plying together two fiber reinforced members having therein two different resins, one of which at least is a curing agent for the other resin and is itself curable at elevated temperatures in contact with the other, pressing together and warming the plied composite until curing is effected in the zone of contact between the two members, and then continuing the warming until the resins throughout the said members are cured.

This process reduces to a minimum the equipment required in the compression step. It also prevents premature setting up of resin in advance of the compositing step, since each resin is separated from the curing agent therefor until the plies to be adhered are brought into actual contact.

Fibrous reinforcement material particularly suitable for the purpose of the invention is a fabric as, for example, woven or knitted cloth, felt, mat, paper or the like. The fibers in the fabric may be of glass, wool, cotton, asbestos, polyamide such as nylon, polyester, wood such as sulfite or sulfate pulp, or other fibers or filaments of this general class. Where a felt or mat is employed this should not be so dense as to inhibit the necessary comingling of the resins on heating. Desirably a light-weight glass filament cloth or impregnated roving is employed.

In general the different resins used in the two members to be plied together are solids (firm plastics) at ordinary temperatures, fusible at an elevated temperature below those of decomposition of the selected fibrous reinforcement and miscible and coreactive with each other when in fused condition, to produce thermoset or cured products, it being understood that usual plasticizers and flow promoters may be incorporated with one or both of the said resins if necessary to lower the temperature of fusion thereof.

The preferred pair in the interleaved or otherwise plied members of the composite is an epoxide resin and the condensate of aniline or like arylamine with formaldehyde. Other combinations that are useful and illustrate the type of pairs to be used are the epoxide resin with a phenol-formaldehyde resin; urea formaldehyde resin with phenolic novolak resins; and phenolic novolak with phenolic resole resins. In each of these pairs, curing occurs when the two resins are in contact at elevated temperatures and more slowly at room temperatures.

More specifically, the epoxide resin used may be any of the common commercial varieties thereof curable with an aminoplast or phenol resin. Examples are epoxidized phenol, cresol, bis-phenol-A, i.e., 2,2'-bis(p-hydroxyphenyl) propane, and the like having more than one epoxy group to the mole of the epoxidized product; i.e., at least one epoxy group per recurring phenolic group.

The aniline-formaldehyde resin is illustrated by the product of the preparation described later herein. Alternatives for the aniline that may be used in the condensation with formaldehyde are other aryl amines, used in the equimolar proportions, examples being the $C_1$–$C_3$ alkyl substituted anilines such as ortho and para toluidenes and ortho and para phenylene diamines. Aniline and also each of these alternative aryl amines are primary, i.e., they contain the groups $>C-NH_2$.

The urea-formaldehyde resin is any acid-curable condensate of urea and formaldehyde.

The phenolic resin is the resinous condensate of any of the phenols listed above with formaldehyde. When the phenolic resin is novolak, it is made with less than a mole of the formaldehyde, e.g., 0.85 mole, to a mole of the phenol and with an acid such as hydrochloric acid as the catalyst of condensation. When the phenolic resin is a resole, it is made with formaldehyde in proportion in excess of one mole as, for example, 1.5–2.5 moles of the formaldehyde to a mole of the phenol, and with sodium hydroxide as the catalyst.

Each resin of the pairs described, without the admixture of any accelerator of curing, is reactive with the other resin of the pair and serves as the sole curing agent therefor. Thus the amine group of the aryl amine-formaldehyde resin cures an epoxidized resin. The phenolic resin also cures the epoxide. The urea-formaldehyde and the resole resin each provide methylol groups which cure novolak resin. The novolak, in turn, provides phenol groups which cause curing in contact with the methylol groups of a resole.

The curing reaction occurs quickly and causes almost instantaneous bonding of contacting faces of the pairs of resins in hot rolling or hot pressing, as at 120° C. or higher. The mass of resin behind the faces then cures more slowly, as diffusion of the coreactive resins occurs at elevated temperatures above the fusion point of the resins to be cured.

The terms "resinous compositions" or "resin" as used herein refer to materials or compositions which, as a whole, are of a resinous nature. Either or both of the resinous compositions may include fillers such as chalk, slate flour, metal powders, starch, and woodflour; plasticizers such as polyoxyalkylene polysulfide rubber, dioctyl or didodecyl phthalate, glycol, glycerol, and the like; initiators, retarders, antioxidants, fungicides, dyes, pigments and other conventional modifiers. Desirably, a dye or pigment may be included to assist in distinguishing one resinous component from the other.

Impregnation of the reinforcement is effected in any of the known ways. In the case of a woven or knitted fabric, for example, it is convenient to pass the fabric through an impregnating bath containing a solution of the resinous composition in a volatile solvent therefor and subsequently through nip-rollers which control the resin content of the fabric issuing from the rolls. The impregnated fabric may then be passed through a heated and ventilated tunnel to remove the volatile solvent. It is also possible, however, to apply the resinous compositions in the molten state, so that the inconveniences associated with removal and recovery of volatile solvents are avoided. Since the reactive components are applied separately, neither procedure involves any danger of premature reaction.

In the case of filaments or rovings, similar impregnating procedures may be employed, but resin content is preferably controlled by passing the filament or roving through a compressing generally circular orifice of suitable diameter.

The impregnated reinforcements may be assembled and cured to give thermoset products in a number of ways. Where the impregnated reinforcement is in the form of a sheet (for example, a woven or knitted fabric, a felt or a paper), thermoset products are conveniently formed by superimposing plies of impregnated reinforcement in such a way that each ply impregnated with the first ("impregnating") resinous composition is in contact with a ply impregnated with the second ("coreactive") resinous composition. In this case the optimum ratio between the two resinous components is achieved by balancing the resin contents in the contacting plies.

In the case of impregnated rovings or filaments it is also possible to achieve correct ratio of the resinous components by varying the proportions in which the two separately treated reinforcements are combined.

The method by which the impregnated reinforcements are formed and cured will depend mainly upon the nature of the reinforcement and the end use to which they are put. Thus impregnated rovings may suitably be wound onto a mandrel to form a pipe or tube, the number of strands of each type being so chosen that the ratio of the two resinous components in the finished article approximates to the optimum.

Laminates, in the form of flat sheets or shaped articles, are produced to advantage by assembling alternate plies of the two impregnated reinforcements and curing the resultant assembly in a suitable mold under heat and pressure.

The following examples illustrate the invention. All proportions are stated by weight and temperatures as ° C.

*Example 1*

A solid epoxide resin was prepared by reacting a phenolic novolak, prepared under acid conditions from 1 mol of phenol and 0.5 mol of formaldehyde and steam distilled to remove free phenol, with a ten-fold excess of epichlorohydrin, in the presence of the calcinated amount of sodium hydroxide. Unreacted epichlorohydrin was removed by distillation and the resultant resin washed with methyl ethyl ketone to remove salt and finally dried. The resin obtained had a melting point of 53°, a molecular weight of 605 and an epoxide value of 0.5, i.e., 0.5 epoxy groups per 100 g. resin.

An aniline-formaldehyde resin was prepared by heating 1 mol of aniline with 0.68 mol of formaldehyde (in the form of a 37% aqueous solution) in the presence of 0.8 mol of hydrochloric acid. On completion of the reaction the resin was precipitated from solution by the addition of the calculated quantity of sodium hydroxide. The precipitate was separated, washed to remove salt and then dried by heating under vacuum to remove water. Free aniline was then removed by subjecting the molten resin to steam distillation.

A 0.12″, 8-end, satin weave glass cloth was impregnated with an acetone solution of the epoxide resin prepared as above and dried. The resin content of the dry cloth was 52%.

A further sample of the same cloth was impregnated with an acetone solution of the aniline-formaldehyde resin made as above and dried, to leave a resin content of 23%.

A laminate prepared by assembling a structure comprising alternate layers of each of the above impregnated reinforcement materials, curing these under pressure for 15 minutes at 150° and post curing the laminate obtained for 6 hours at 200°, was found to have the following properties.

Initial flexural strength at 20° _____p.s.i.___ 69,000
Strength retention after 3 hr. boil ____percent__ 88
Strength retention at 70° after ½ hr.
 at 70° _____do____ 78
Strength retention at 90° after ½ hr.
 at 90° _____do____ 75.5
Strength retention at 150° after ½ hr.
 at 150° _____do____ 40

*Example 2*

Glass rovings impregnated with an epoxide resin prepared as in Example 1 were wound onto a heated rotating mandrel at the same time as similar rovings impregnated with the aniline-formaldehyde resin of Example 1. In this case, the resin content of the aniline-formaldehyde resin impregnated rovings was approximately equal to that of the epoxide resin impregnated rovings. The optimum desired ratio of 2:5 was attained, therefore, by employing 2 strands of the former for every 5 strands of the latter, the reels being suitably staggered so as to obtain even distribution. The resulting tube, after curing, had good strength and water and boiling resistance.

When, as in Examples 1 and 2, the fibers used are inorganic and, therefore, not carbonizable by heat, the resins as used must be fusible at temperatures below that of thermal decomposition of the resins and be cured at a temperature below this decomposition point.

*Example 3*

Woven cotton sheets are impregnated with an aqueous acidic solution of 25% solids content of novolak resin (the product of condensation of 1 mol of phenol and 0.8 mol of formaldehyde with hydrochloric acid as catalyst), the excess solution removed by pressure rollers, and the whole then dried in air at about 80°.

Other sheets of the same kind are impregnated with an aqueous alkaline solution of 25% solids content of a resole resin (the product of condensation of 1 mol of phenol with 1.5 moles of formaldehyde with sodium hydroxide as the catalyst), rolled and then dried as above.

The sheets with the two kinds of resins are then interleaved, composited under pressure, and heated to 140° while still compressed, until thoroughly bonded and then held at atmospheric pressure and about 140° until the curing to plastics that are firm when cold is substantially completed.

The acid and alkali in the two resin solutions neutralize each other and cause gelation and, at the elevated temperature, curing occurs.

In a modification of this example, glass fiber cloth is substituted for the cotton sheets.

*Example 4*

The procedure and compositions of Example 3 are used except that the resole is replaced by an equal weight of urea-formaldehyde resin in acid curable condition.

In the subsequent pressing and heating, the novolak and the urea-formaldehyde resin promote curing of each other.

*Example 5*

The composition and procedure of Example 1 are used except that the aniline-formaldehyde resin solution is replaced by an aqueous solution of 25% resin solids content, the resin being a phenol-formaldehyde resole and the solution containing sodium hydroxide in about the minimum amount, such as 5% of the solution, to cause the resole to dissolve in the water.

So long as the contacting plies in the composites as originally assembled have the resins as continuous phases, there will be an adequate amount of each resin to cure the different resin curable thereby. While we use ordinarily approximately equal weights of the two resins on the dry basis, the proportions may be varied widely, from about 10%–90% of one of the resins and usually 25%–75% on the weight of the two resins constituting the pair used. The exact choice of the proportions will depend upon the rate of curing desired and also the firmness and strength desired in the cured resin.

PROPERTIES OF PRODUCTS

The physical tests on representative laminates have been given.

The processes of the examples give impervious resinous sheets (or the tubes in Example 2) in which the resinous material consitutes a continuous phase with the reinforcing fibers embedded therein. The cured resins are not soluble in or extractable by water. All products are strong and crack resistant.

It will be understood that it is intended to cover all changes and modifications of the examples of the invention herein chosen for the purpose of illustration which do not constitute departures from the spirit and scope of the invention.

What I claim is:

1. The process of making a fiber reinforced resin article which comprises impregnating a fibrous reinforcing sheet with epoxidized phenolic resin having at least one epoxy group per recurring phenolic group and impregnating another fibrous reinforcing sheet with the condensation product of aniline and formaldehyde, pressing together the thus impregnated sheets and heating the assembly so made at a temperature above the fusion point of the epoxidized phenolic resin and the condensation product and below the temperature of decomposition of said fibrous reinforcing sheet until the epoxidized phenolic resin and said condensation product cure each other.

2. The process of claim 1, the fiber reinforcing sheet being a fabric.

3. The process of claim 1, the fiber reinforcing sheet being a fabric of glass fibers.

4. In making a plied fiber reinforced resinous article, the process which comprises impregnating a fibrous reinforcing member with one resin of a pair of resins and impregnating another fibrous reinforcing member with the second resin of the pair of resins, pressing together the thus impregnated members, heating the assembly so made at a temperature between the fusion points of said resins and the decomposition point of the fibrous reinforcement until curing is effected in the zone of contact between the two members, and continuing the heating until the resins throughout the said members are cured, said pair of resins being selected from the group consisting of an epoxidized phenolic resin having at least one epoxy group per recurring phenolic group in the resin and a primary aryl amide-formaldehyde condensate resin; and an epoxidized phenolic resin having at least one epoxy group per recurring phenolic group in the resin and a phenol formaldehyde resin.

5. The process of claim 4, the reinforcing members being fabrics and said impregnating being effected by substantially saturating each member with an aqueous solution of the resin to be impregnated thereinto and then evaporating water from the solution until a dry continuous resin phase remains on the surface of the fabric.

6. The process of claim 4, said pair of resins being the epoxidized phenolic resin having more than one epoxy group per recurring phenolic group and primary aryl amine-formaldehyde condensate.

References Cited by the Examiner
UNITED STATES PATENTS

| | | | |
|---|---|---|---|
| 2,510,885 | 6/1950 | Greenlee. | |
| 2,528,359 | 10/1950 | Greenlee. | |
| 2,557,826 | 6/1951 | Keaton | 156—310 |
| 2,639,258 | 5/1953 | Evans | 156—310 |
| 2,651,589 | 9/1953 | Shakal | 156—310 |
| 2,810,674 | 10/1957 | Madden. | |
| 2,839,495 | 6/1958 | Carey. | |
| 2,865,886 | 12/1958 | Greenlee. | |

OTHER REFERENCES

Lee, H., and Neville, K., Epoxy Resins, Their Applications and Technology, McGraw-Hill, 1957, pp. 155–158.

Skeist, Irving, Epoxy Resins, Reinhold Publishing Corporation, New York, second printing, December 1959, pp. 21–25, 29–31, 37 and 188.

EARL M. BERGERT, *Primary Examiner.*